United States Patent
Niewolak et al.

(10) Patent No.: US 8,232,020 B2
(45) Date of Patent: Jul. 31, 2012

(54) INTERCONNECTOR FOR A FUEL CELL STACK AND METHOD FOR PRODUCTION

(75) Inventors: Leszek Niewolak, Juelich (DE); Willem J. Quadakkers, EG Wijnandsrade (NL); Lorenz Singheiser, Juelich (DE)

(73) Assignee: Forschungszentrum Juelich GmbH, Juelich (DE)

( * ) Notice: Subject to any disclaimer, the term of this patent is extended or adjusted under 35 U.S.C. 154(b) by 803 days.

(21) Appl. No.: 12/227,537

(22) PCT Filed: Apr. 18, 2007

(86) PCT No.: PCT/DE2007/000669
§ 371 (c)(1),
(2), (4) Date: Nov. 20, 2008

(87) PCT Pub. No.: WO2007/134560
PCT Pub. Date: Nov. 29, 2007

(65) Prior Publication Data
US 2009/0253020 A1    Oct. 8, 2009

(30) Foreign Application Priority Data
May 23, 2006 (DE) .......................... 10 2006 024 039

(51) Int. Cl.
*H01M 8/02* (2006.01)
*B32B 15/04* (2006.01)
*B05D 5/12* (2006.01)
(52) U.S. Cl. ......... 429/468; 427/115; 427/405; 428/469
(58) Field of Classification Search .................. 429/468, 429/479; 428/469; 427/115, 405
See application file for complete search history.

(56) References Cited

U.S. PATENT DOCUMENTS

| | | | |
|---|---|---|---|
| 6,326,096 B1 | 12/2001 | Virkar et al. | |
| 6,492,053 B1* | 12/2002 | Donelson et al. | ............. 429/458 |
| 7,390,582 B2 | 6/2008 | Tietz et al. | |

(Continued)

FOREIGN PATENT DOCUMENTS

CN     2400908     10/2000

(Continued)

OTHER PUBLICATIONS

Michalik M et al: "Effect of component thickness on lifetime and oxidation rate of chromia forming ferritic steels in low and high pO2 environments" Materials At High Temperatures, Butterworth Heinemann, Guildford, GB, vol. 22, No. 3-4, 2005, pp. 213-221, XP008083919 ISSN: 0960-3409 p. 214, left-hand column, line 25-p. 215, right-hand column, line 9, figures 1, 4, 5; table 2.

*Primary Examiner* — Stephen J. Kalafut
(74) *Attorney, Agent, or Firm* — Jordan and Hamburg LLP

(57) ABSTRACT

An interconnector is made of ferritic chromium steel, on which a cupriferous layer is disposed. This layer prevents interdiffusion between the chromium steel and additional components with which the interconnector has direct contact. According to the state of the art, such diffusion occurs particularly if these additional components contain nickel. In addition, the interconnector may comprise a chromium-containing oxide layer as a barrier against interdiffusion. For this purpose, the interconnector steel can also be preoxidized before applying the cupriferous layer. The interconnector has a significantly longer service life than interconnectors according to the state of the art, and it has improved electrical conductivity because the electrical contact surface thereof is free of oxides and has high transverse conductivity.

15 Claims, 2 Drawing Sheets

U.S. PATENT DOCUMENTS

| | | |
|---|---|---|
| 7,407,717 B2 | 8/2008 | Tietz et al. |
| 2002/0094465 A1 | 7/2002 | Fleck et al. |
| 2003/0224234 A1 | 12/2003 | Steele et al. |
| 2006/0286433 A1* | 12/2006 | Rakowski et al. ............ 429/38 |

FOREIGN PATENT DOCUMENTS

| | | |
|---|---|---|
| CN | 1667859 | 9/2005 |
| DE | 199 13 873 | 5/2000 |
| DE | 103 06 647 | 9/2004 |
| DE | 103 06 649 | 9/2004 |
| WO | WO-00/59057 | 10/2000 |
| WO | WO-02/058169 | 7/2002 |
| WO | WO-2006/138070 | 12/2006 |

* cited by examiner

INTERCONNECTOR FOR A FUEL CELL STACK AND METHOD FOR PRODUCTION

BACKGROUND OF THE INVENTION

The invention relates to an interconnector for a fuel cell stack and to a method for production.

A high-temperature fuel cell converts the chemical energy of a fuel, such as hydrogen or methane, directly into chemical energy. To this end, the fuel is oxidized using an oxidizing agent, such as air or pure oxygen. The fuel and oxidizing agent are separated by an oxygen ion-conducting solid electrolyte, such as yttrium-stabilized zirconium oxide.

The electrolyte is coated with porous, catalytically acting electrode materials. In general, the anode on the fuel side is made of a cermet of metallic nickel and zirconium oxide. The cathode on the oxidizing agent side is typically made of perovskite, based on lanthanum.

Since an individual fuel cell only supplies a very low voltage, for technical applications, a plurality of cells must be interconnected in a fuel cell stack. To this end, a gas-tight, yet electrically conductive interconnector is disposed between two fuel cells. The interconnector must have a thermal coefficient of expansion between $10 \times 10^{-6}$ and $12 \times 10^{-6}$ K$^{-1}$ that is suited to the remaining components of the fuel cells. In addition, it must not oxidize in the operating atmospheres for the fuel cell.

In principle, ferritic chromium steels meet these requirements. However, contacting the anode with such an interconnector is problematic. The protective oxide layer formed by these materials drastically reduces the electrical conductivity of the interconnector. Furthermore, nickeliferous means are typically used for the electrical contact between the interconnector and the anode. If these means are in direct contact with the interconnector, both these means and the interconnector disadvantageously degrade after only a relatively short operating period.

SUMMARY OF THE INVENTION

The underlying object of the invention is therefore to provide an interconnector for a fuel cell stack, which has an improved life span, particularly upon contact with nickeliferous materials.

This object is achieved according to the invention by an interconnector according to the main claim, use according to the independent claim, and a method according to an additional independent claim. Further advantageous embodiments will be apparent from the dependent claims that refer to these claims.

As part of the invention, an interconnector made of ferritic chromium steel and provided with a cupriferous layer on at least part of the surface was discovered. Pure copper, or a copper alloy having at least 50 wt % of copper, is a particularly suitable material for the cupriferous layer.

The cupriferous layer provides the interconnector with improved durability of when it is exposed to corrosive substances, such as nickel. Such a situation is notably encountered if an electrical contacting means is disposed on the cupriferous layer.

For example, an electrical contacting means is disposed on the cupriferous layer if the interconnector is used in a fuel cell, or in a fuel cell stack. Here, the anode of the fuel cell is typically electrically connected to the interconnector by a nickeliferous contacting means, such as a wire mesh or netting made of nickel. The wire mesh or netting is attached to the cupriferous layer using conventional methods for joining metal materials, such as spot welding or soldering.

Alternatively, the anode of a fuel cell can be disposed directly on the interconnector, wherein the anode often comprises nickel.

Upon contact with corrosive substances, such as nickel, the cupriferous layer provided according to the invention provides the arrangement with improved durability in three ways.

1) The diffusion of elements from the steel, particularly chromium and manganese, via the cupriferous layer to the exterior is slowed. According to the state of the art, this undesirable diffusion causes the formation of chromium oxides, such as $Cr_2O_3$ or $Cr_2MnO_4$, particularly on the nickel surfaces that are in contact with the interconnector. In fuel cells, this has the disadvantageous effect that the desired catalytic effect of these nickel surfaces is diminished. According to the invention, this catalytic effect is now maintained over a long period of time.

2) The diffusion of nickel from the surrounding area, particularly from an electrical contact means disposed on the cupriferous layer, into the steel is diminished. According to the state of the art, this undesirable diffusion causes the steel to be transformed into an austenitic structure, which impairs the resistance to oxidation of the steel and at the same time brings about an undesirable increase in the coefficient of expansion thereof. In the multi-layer arrangement in a fuel cell, this results in thermal stress and ultimately in the formation of cracks, making the fuel cell unusable. According to the invention, the ferritic structure of the steel remains unchanged, so that these problems do not occur for a long period of time.

3) Since the oxide layer formed directly on the surface of the steel no longer comes in contact with nickel from the surrounding area, it no longer is attacked by the nickel. According to the state of the art, the steel is in direct contact with nickel if, for example, a nickeliferous electrical contacting means is disposed on the interconnector. At the contact points between steel and nickel, the steel is no longer protected from carbon inclusion. For example, the interconnector is in contact with carbon if it is used in a fuel cell and the cell is operated with a carbon-containing fuel, such as methane or methanol. The inclusion of carbon disadvantageously brings about carburization of the steel, thereby causing embrittlement. According to the invention, firstly, the oxide layer on the steel is no longer attacked, and secondly the cupriferous layer protects the steel from contact with carbon, since copper has extremely low carbon solubility. As a result, virtually no carbon is included in the steel, and the steel remains ductile.

Advantageously, the interconnector comprises a chromium-containing oxide layer, which further slows interdiffusion between the steel and the environment thereof, particularly between the steel and an electrical contact element made of nickel.

Interdiffusion between two materials A and B is the mutual diffusion of the two materials into each other. A diffuses into B, and B diffuses into A.

The chromium-containing oxide layer can be formed, for example, by chromium and optionally additional elements (such as manganese) diffusing from the steel into the cupriferous layer, as does oxygen from the surrounding area, when using the interconnector in a high-temperature fuel cell, or in the case of preoxidation of the interconnector prior to the first use thereof.

In a particularly advantageous embodiment, the chromium-containing oxide layer is disposed within the cupriferous layer. If the interconnector is in contact in a plurality of places, the conductivity of these contact points is then not impaired by the oxide layer. Due to the high transverse conductivity of the cupriferous layer, power flow through the interconnector is distributed across the entire cross-sectional surface thereof, so that a current supplied via the contact can pass through the interconnector substantially unimpaired. The oxide layer is typically formed in the approximate center of the cupriferous layer, since the diffusion rates of oxygen, chromium and manganese in copper are about equal. When using alloys having a low copper content instead of pure copper, only the relative position of the oxide changes.

If the diffusion of elements from the steel into the cupriferous layer is suppressed by additional measures, the oxide layer can alternatively be disposed at the interface between the cupriferous layer and the chromium steel. In this case as well, power flow through the interconnector is not significantly impaired.

In a particularly advantageous embodiment of the invention, an additional $Cr_2O_3$ layer is disposed at the interface between the chromium steel and the cupriferous layer. This additional oxide layer forms a further barrier against interdiffusion between the interconnector and other components in contact therewith. Such a $Cr_2O_3$ layer can be formed, for example, by preoxidizing the steel before applying the cupriferous layer. Advantageously, it has a thickness between 0.2 and 3 µm.

The advantageous thickness of the cupriferous layer depends on the respective designs of the fuel cells and on the operating temperatures and operating durations thereof. It can be determined by a person skilled in the art without undue experimentation. However, the cupriferous layer, including an optionally present additional chromium-containing oxide layer, preferably has a thickness of between 5 and 1000 µm, and particularly preferably between 10 and 50 µm. The cupriferous layer can be applied using conventional coating methods. For example, sputtering, electroplating, metal-plating, or spraying methods, such as vacuum plasma spraying (VPS), atmospheric plasma spraying (APS), or high velocity oxy-fuel spraying (HVOF), are suitable for this.

The interconnector according to the invention is particularly suited for use in a fuel cell, or in a fuel cell stack. With such use, the anode of the fuel cell can be connected to the interconnector via an electrical contact means. This contact means may contain nickel and may notably be a wire mesh or netting, which is attached to the cupriferous layer by means of spot welding or soldering.

Alternatively, the anode of a fuel cell is disposed directly on the cupriferous layer. This brings about the best possible electrical contact with the interconnector, and also with the adjacent fuel cell when used in a fuel cell stack. At the same time, this makes possible a compact design for the arrangement, which is particularly advantageous for fuel cell stacks made of large number of individual cells for mobile use. In many cases, the cupriferous layer according to the invention alone makes this advantageous arrangement technologically useful, since the anode of a high-temperature fuel cell frequently contains nickel in the form of nickel oxide or metallic nickel. In the state of the art, with this arrangement it must be accepted that the nickel will damage the steel in the manner described above, and vice versa, that elements from the steel damage the anode.

Instead of copper, it is also possible to use other metal elements or alloys. Particularly suitable are materials, which:
- do not diffuse, or diffuse only slightly, into the steel at the operating temperature of a high-temperature fuel cell;
- have comparable solubility levels with respect to chromium, manganese and oxygen at the operating temperature, or at the temperature at which the steel is preoxidized; and
- do not oxidize in the operating atmosphere of the fuel cell.

These conditions are met, for example, by copper alloys comprising at least 50 wt % of copper.

As part of the invention, a method for producing an interconnector made of ferritic chromium steel was developed. According to this method, a cupriferous layer is applied to at least some regions of the surface of the interconnector. This prevents, as described above, interdiffusion between the chromium steel and the materials with which the interconnector is in contact.

In a particularly advantageous embodiment of the invention, chromium diffuses from the interconnector into the cupriferous layer and oxygen diffuses from the surrounding area into the cupriferous layer. These form a chromium-containing oxide layer, which further reduces interdiffusion between the chromium steel and the environment of the interconnector. Where the chromium-containing oxide layer forms depends on the ratio of the diffusion speeds of the chromium and oxygen. If chromium and oxygen diffuse into the cupriferous layer unimpaired, the oxide layer typically forms at the center of the cupriferous layer. If the diffusion of chromium from the steel is suppressed by additional measures, however, the oxide layer may also form at the interface between the cupriferous layer and the chromium steel.

This method is considerably simpler than the direct production of a three-part layer comprising a cupriferous layer, a chromium-containing oxide layer, and another cupriferous layer on the chromium steel. If the interconnector is used in a high-temperature fuel cell, for example, the oxide layer advantageously forms during operation. Chromium diffuses from the steel into the cupriferous layer, possibly together with other metals, such as manganese. Oxygen diffuses from the operating atmosphere of the fuel cell into the cupriferous layer.

In addition to copper, elements and alloys are suitable, which:
- do not diffuse, or diffuse only slightly, into the steel at the operating temperature of a high-temperature fuel cell;
- have comparable solubility levels with respect to chromium, manganese and oxygen at the operating temperature, or the temperature at which the steel is preoxidized; and
- do not oxidize in the operating atmosphere of the fuel cell.

These conditions are met, for example, by copper alloys comprising at least 50 wt % of copper.

The interconnector advantageously is subjected to heat treatment. In this manner, the conditions under which the oxide layer forms can be much better controlled than if this is formed during the first use of the interconnector at high temperatures. As a result, the oxide layer has a higher quality. It is consequently more durable and slows interdiffusion into, and out of, the steel to a higher degree.

In a particularly advantageous embodiment of the invention, the heat treating operation is performed before applying the cupriferous layer. This results in the formation of a $Cr_2O_3$ layer on the chromium steel, providing an even better barrier against interdiffusion between the chromium steel and the environment thereof, which may contain nickel. During high-temperature use after application of the cupriferous layer, this $Cr_2O_3$ layer continues to grow. However, no oxide layer develops within the cupriferous layer, but only at the interface between the steel and the cupriferous layer.

The heat treating operation is advantageously carried out at a temperature above 800° C., and particularly above 1000° C. The time required for heat treating varies between 1 and 100 hours. This depends on the temperature selected, with shorter times being selected at higher temperatures because the growth rate of oxide increases with rising temperatures.

Advantageously, during the heat treating operation an oxidation gas is added to the metal layer, the oxygen partial pressure of the gas being lower at the selected temperature than the decomposition pressure of an oxide of the metal M at this temperature. This ensures that the metal M does not oxidize during heat treatment. The oxidation gas can, for example, be a mixture comprising 94 percent by volume argon, 4 percent by volume hydrogen, and 2 percent by volume water vapor. At a temperature of 800° C. with copper as the metal M, this gas ensures that the copper does not oxidize.

The object of the invention will be explained in more detail below with reference to the figures, without limiting the object of the invention.

DESCRIPTION OF THE PREFERRED EMBODIMENTS

Figure 1A:
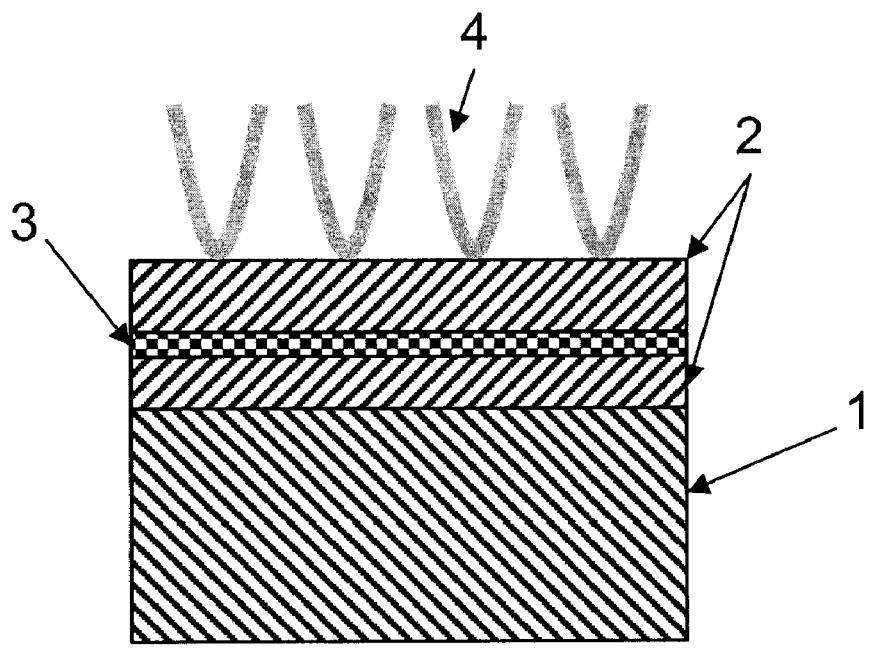
FIG. 1: Two embodiments of the interconnector according to the invention having electrical contact means 4 made of nickel. Panel a: Comprising an oxide layer 3 within the cupriferous layer 2. Panel b: Comprising an oxide layer 3 between the interconnector steel 1 and the cupriferous layer 2.
Figure 1B:
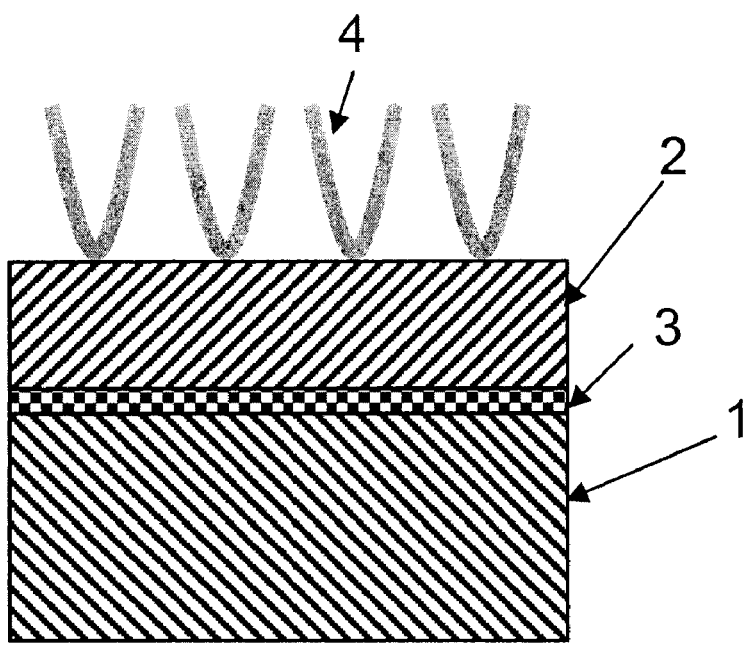

FIG. 1 shows two embodiments of the interconnector according to the invention. On the interconnector steel 1 a cupriferous layer 2 and a chromium-containing oxide layer 3 are disposed. In panel a, the oxide layer 3 is located within the cupriferous layer 2. In panel b, it is provided between the interconnector steel 1 and the cupriferous layer 2. Electrical contact means 4, which are made of nickel, are disposed on the cupriferous layer 2.

Figure 2:
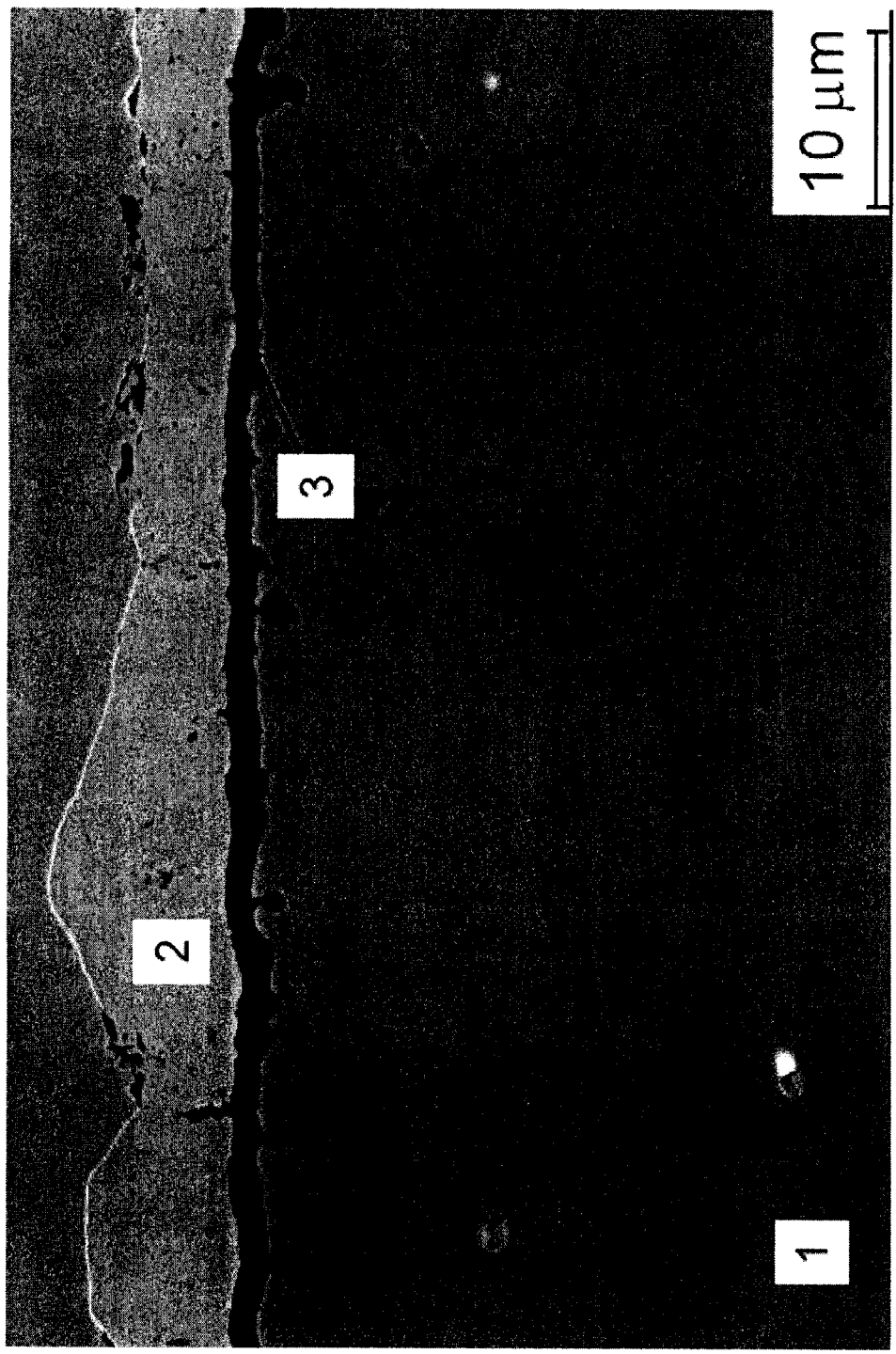
FIG. 2: Sectional view of the embodiment of the interconnector according to the invention shown in the schematic view in FIG. 1 b.

FIG. 2 shows a sectional view of the embodiment of the interconnector according to the invention shown in the schematic view in FIG. 1 b. First, the interconnector steel 1 was preoxidized for 20 hours at 800° C. To this end, a mixture comprising 94 percent by volume argon, 4 percent by volume hydrogen, and 2 percent by volume water vapor served as the oxidation gas. Following preoxidation, the cupriferous layer 2 was applied, and the interconnector was oxidized again for 1000 hours under the same conditions. The end product comprises a stable oxide layer 3 at the interface between the interconnector steel 1 and the cupriferous layer 2.

The oxide layer 3 develops in advance during preoxidation. It is a two-part layer made of $Cr_2O_3$ and $Cr_2MnO_4$. At 800° C., this layer grows in approximate accordance with a parabolic rate law. The oxide layer 3 continues to grow during the second oxidation after applying the cupriferous layer 2 to this oxide layer 3. The cupriferous layer 2 has no influence on the composition of the two-part oxide layer 3 made of $Cr_2O_3$ and $Cr_2MnO_4$. It only influences the growth rate of this layer during the second oxidation process because it influences the diffusion of oxygen.

Alternatively, the combination of the oxide layer and cupriferous layer can also be produced from a copper oxide-containing layer. To this end, the non-preoxidized chromium steel is first provided with the copper oxide-containing layer, which preferably has a thickness of between 2 and 30 μm. The layer can be applied using conventional coating methods, such as sputtering, plasma spraying or slip casting, or in the form of a suspension.

Then, the steel is heat treated, preferably at temperatures between 600 and 900° C. For this purpose, a reducing gas or gas mixture is preferably used, in order to create an atmosphere in which the copper oxide is thermodynamically unstable. The times and other heat treatment parameters can be selected as for the preoxidation described above.

During heat treatment, the copper oxide is reduced to copper from the exterior. Chromium from the steel reduces the copper oxide at the interface with the steel, whereupon the desired oxide layer based on $Cr_2O_3$ develops on the steel.

The invention claimed is:

1. An interconnector for a fuel cell made of ferritic chromium steel, comprising a cupriferous layer including at least 50 wt % copper or copper alloy, disposed in at least some regions of the surface thereof, and an additional chromium-containing oxide layer made of $Cr_2O_3$ disposed at the interface between the cupriferous layer and the chromium steel, and wherein the cupriferous layer does not oxidize in an operating atmosphere of a fuel cell that includes the interconnector, the operating atmosphere including an oxidizing agent.

2. The interconnector according to claim 1, comprising a further oxide layer is disposed within the cupriferous layer.

3. An interconnector according to any one of claim 1 or 2, wherein the $Cr_2O_3$ layer has a thickness of between 0.2 and 3 mm.

4. An interconnector according to any one of claims 1 or 2, wherein the cupriferous layer, including the additional chromium-containing $Cr_2O_3$ oxide layer, has a thickness of between 5 and 1000 mm.

5. The interconnector according to claim 4, wherein the cupriferous layer, including the additional chromium-containing $Cr_2O_3$ oxide layer, has a thickness of between 10 and 50 mm.

6. An interconnector according to any one of claim 1 or 2, comprising at least one electrical contact means which is disposed on the cupriferous layer.

7. The interconnector according to claim 5, comprising a nickeliferous contact means.

8. The interconnector according to claim 6, comprising a wire mesh or netting made of nickel as a contact means.

9. The interconnector according to claim 7, wherein the wire mesh or netting is attached to the cupriferous layer by means of spot welding or soldering.

10. A method for producing an interconnector for a fuel cell made of ferritic chromium steel, comprising a cupriferous layer made of copper or copper alloy, disposed in at least some regions of the surface thereof, and an additional chromium-containing oxide layer made of $Cr_2O_3$ disposed at the interface between the cupriferous layer and the chromium steel, wherein the cupriferous layer made of copper, or copper alloy is applied to at least to some regions of the surface thereof, and the interconnector is subjected to a heat treating operation before application of the cupriferous layer.

11. The method according to claim 10, wherein the heat treating operation is performed at a temperature above 800° C.

12. A method according to claim 10, wherein during the heat treating operation, a mixture comprising 94 percent by volume argon, 4 percent by volume hydrogen, and 2 percent by volume water vapor is used as the oxidation gas.

13. A method according to claim 10, wherein chromium diffuses from the interconnector into the copper-containing layer, thereby forming another oxide layer within the cupriferous layer.

14. The method according to claim 10, wherein the heat treating operation is performed at a temperature above 1000° C.

15. The method according to claim 10, wherein a further oxide layer is disposed within the cupriferous layer.

* * * * *